United States Patent
Hao et al.

(10) Patent No.: US 9,328,265 B2
(45) Date of Patent: May 3, 2016

(54) NANO-POROUS ADHESIVE TIE LAYER

(75) Inventors: Encai Hao, Woodbury, MN (US); Kurt C. Melancon, White Bear Lake, MN (US); Audrey A. Sherman, Saint Paul, MN (US); William Blake Kolb, West Lakeland, MN (US); Robert F. Kamrath, Mahtomedi, MN (US); Maureen A. Kavanagh, Stanchfield, MN (US); Chris J. Tanley, Woodbury, MN (US); Jeffrey A. Peterson, Lake Elmo, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 772 days.

(21) Appl. No.: 13/512,984

(22) PCT Filed: Nov. 29, 2010

(86) PCT No.: PCT/US2010/058195
§ 371 (c)(1),
(2), (4) Date: Jul. 25, 2012

(87) PCT Pub. No.: WO2011/068754
PCT Pub. Date: Jun. 9, 2011

(65) Prior Publication Data
US 2012/0282455 A1  Nov. 8, 2012

Related U.S. Application Data

(60) Provisional application No. 61/266,625, filed on Dec. 4, 2009.

(51) Int. Cl.
| | | |
|---|---|---|
| B32B 3/26 | (2006.01) | |
| C09J 7/02 | (2006.01) | |
| C09J 133/00 | (2006.01) | |
| C09J 175/16 | (2006.01) | |
| C08K 3/36 | (2006.01) | |

(52) U.S. Cl.
CPC .............. *C09J 7/0246* (2013.01); *C09J 133/00* (2013.01); *C09J 175/16* (2013.01); *C08K 3/36* (2013.01); *C09J 2433/00* (2013.01); *C09J 2467/006* (2013.01); *C09J 2475/00* (2013.01); *Y10T 428/249984* (2015.04)

(58) Field of Classification Search
CPC ...... C09J 7/0246; C09J 133/00; C09J 175/16; C08K 9/00
See application file for complete search history.

(56) References Cited

U.S. PATENT DOCUMENTS

| | | | | |
|---|---|---|---|---|
| 3,544,489 | A * | 12/1970 | McBane et al. | 428/315.5 |
| 5,204,219 | A | 4/1993 | Van | |
| 6,893,731 | B2 | 5/2005 | Kausch | |
| 2003/0077437 | A1* | 4/2003 | Nakamura et al. | 428/327 |
| 2006/0204528 | A1 | 9/2006 | Nolte | |
| 2008/0299317 | A1 | 12/2008 | Hable | |

FOREIGN PATENT DOCUMENTS

| | | |
|---|---|---|
| EP | 0372756 | 12/1993 |
| EP | 1785753 | 5/2007 |
| JP | 2002-173961 | 6/2002 |
| JP | 2004-017410 | 1/2004 |
| WO | WO 2010-120468 | 10/2010 |
| WO | WO 2010-120864 | 10/2010 |

* cited by examiner

*Primary Examiner* — Victor Chang
(74) *Attorney, Agent, or Firm* — Yen T. Florczak

(57) ABSTRACT

An adhesive tie layer includes a binder including a multifunctional acrylate and a polyurethane, surface treated nanoparticles dispersed in the binder, and a plurality of interconnected voids. A volume fraction of interconnected voids in the adhesive tie layer is not less than about 10%.

6 Claims, 2 Drawing Sheets

NANO-POROUS ADHESIVE TIE LAYER

CROSS REFERENCE TO RELATED APPLICATIONS

This application is a national stage filing under 35 U.S.C. 371 of PCT/US2010/058195, filed Nov. 29, 2010, which claims priority to U.S. Application No. 61/266,625, filed Dec. 4, 2009, the disclosure of which is incorporated by reference in their entirety herein.

FIELD

The present application relates generally to nano-porous adhesive tie layers and adhesive articles using the same. The present application more specifically relates to nano-porous adhesive tie layers that bond an adhesive layer to a substrate.

BACKGROUND

Priming layers are used when bonding or coating two different materials together. One objective of the priming layer is to control the level of adherence of one material to another. The priming layer can be used to increase bond strength between two layers.

Where a coating is applied to a substrate and the composition of the coating does not have a natural affinity for the substrate, a primer layer can be used. Materials such as polyethylene terephthalate or polyolefins have well known problems in having coatings adhered thereto.

As adhesives are being designed with higher and higher adhesion to adherents and or target surfaces, the need for better and better priming is recognized to provide the required bond strength between the backing and the adhesive of these adhesive articles. The ability to provide higher strength primers or tie layers on specific target backings enables the creation of new adhesive articles having aggressive adhesives.

SUMMARY

The present application relates generally to nano-porous adhesive tie layers and adhesive articles using the same. The present application more specifically relates to nano-porous adhesive tie layers that bond an adhesive layer to a substrate. These and various other features and advantages will be apparent from a reading of the following detailed description.

In one embodiment, an adhesive tie layer includes a binder including a multifunctional acrylate and a polyurethane, surface treated nanoparticles dispersed in the binder, and a plurality of interconnected voids. A volume fraction of interconnected voids in the adhesive tie layer is not less than about 10%.

In another embodiment, an adhesive article includes an adhesive forming an adhesive layer, a polymeric substrate, and an adhesive tie layer between the adhesive layer and the polymeric substrate. The adhesive tie layer secures the adhesive layer to the polymeric substrate. The adhesive tie layer includes a binder including a multifunctional acrylate and a polyurethane, surface treated nanoparticles dispersed in the binder, and a plurality of interconnected voids. A volume fraction of interconnected voids in the adhesive tie layer is not less than about 10% and the adhesive fills at least a portion of the plurality of interconnected voids.

In a further embodiment, an adhesive article includes a first adhesive layer, a second adhesive layer, and a polymeric substrate disposed between the first adhesive layer and the second adhesive layer. A first adhesive tie layer is between the first adhesive layer and the polymeric substrate and a second adhesive tie layer is between the second adhesive layer and the polymeric substrate. The first adhesive tie layer secures the first adhesive layer to the polymeric substrate and the second adhesive tie layer secures the second adhesive layer to the polymeric substrate. The first and second adhesive tie layers include a binder including a multifunctional acrylate and a polyurethane, surface treated nanoparticles dispersed in the binder, and a plurality of interconnected voids. A volume fraction of interconnected voids in the first and second adhesive tie layers is not less than about 10% and the first and second adhesive layers fill at least a portion of the plurality of interconnected voids.

BRIEF DESCRIPTION OF THE DRAWINGS

The disclosure may be more completely understood in consideration of the following detailed description of various embodiments of the disclosure in connection with the accompanying drawings, in which.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
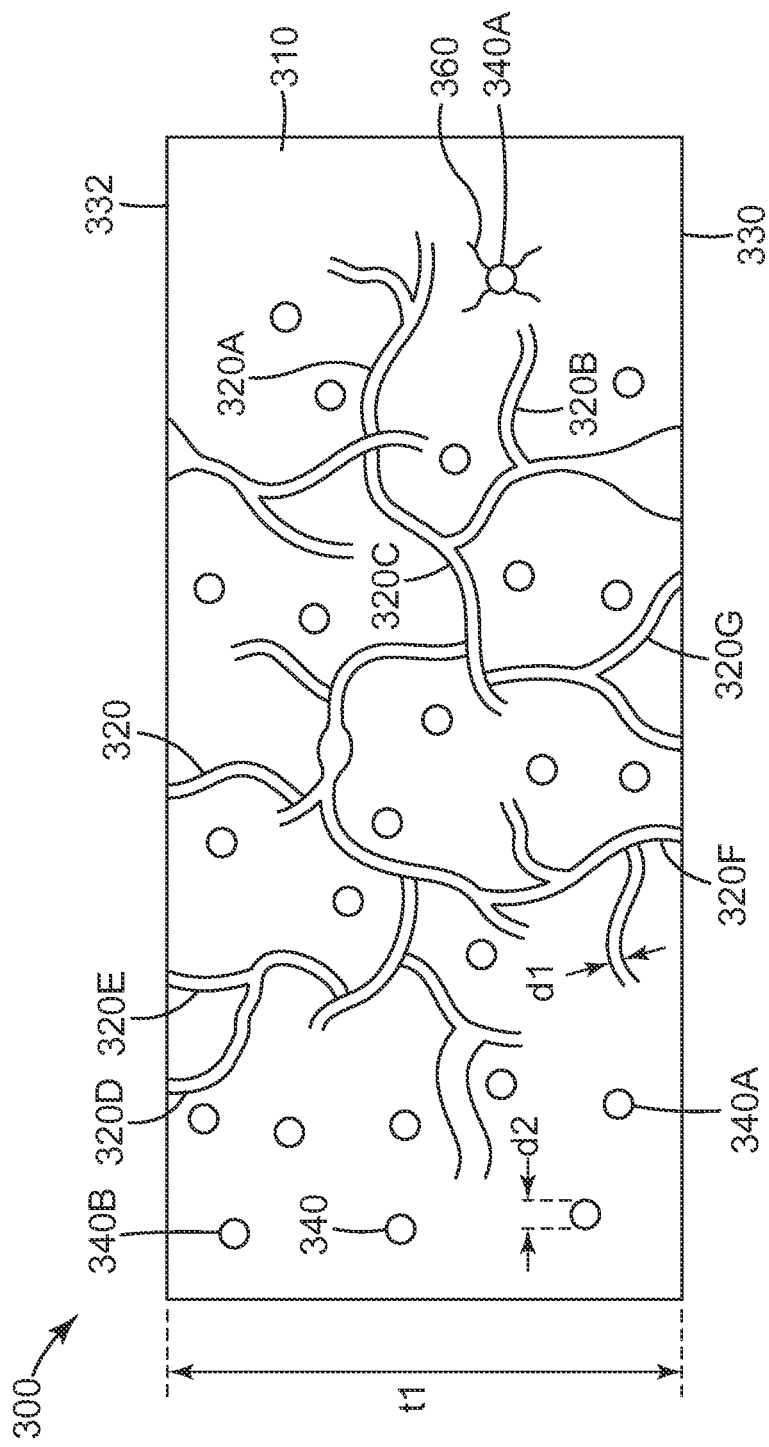
FIG. 1 is a schematic cross-sectional view of a nano-porous adhesive tie layer.

In the following description, reference is made to the accompanying set of drawings that form a part hereof and in which are shown by way of illustration several specific embodiments. It is to be understood that other embodiments are contemplated and may be made without departing from the scope or spirit of the present disclosure. The following detailed description, therefore, is not to be taken in a limiting sense.

As used herein, terms such as "between", "vertical", "horizontal", "above", "below", "left", "right", "upper" and "lower", "clockwise" and "counter clockwise" and other similar terms, refer to relative positions as shown in the figures. In general, a physical embodiment can have a different orientation, and in that case, the terms are intended to refer to relative positions modified to the actual orientation of the device.

The recitation of all numerical ranges by endpoint is meant to include all numbers subsumed within the range (i.e., the range 1 to 10 includes, for example, 1, 1.5, 3.33, and 10).

The present application relates generally to nano-porous adhesive tie layers and adhesive articles using the same. The present application more specifically relates to nano-porous adhesive tie layers that bond an adhesive layer to a substrate. The nano-porous adhesive tie layer can include a cross-linked network of surface treated silica nanoparticles, polyurethane oligomer, multifunctional acrylates and a plurality of interconnected voids. The nano-porous structure of the nano-porous adhesive tie layer creates a large contact area at the adhesive interface with the nano-porous adhesive tie layer, thus improving adhesion. While the present disclosure is not so limited, an appreciation of various aspects of the disclosure will be gained through a discussion of the examples provided below.

The nano-porous adhesive tie layers disclosed herein, can include a plurality of interconnected voids or a network of voids dispersed in a binder. At least some of the voids in the plurality or network are connected to one another via hollow tunnels or hollow tunnel-like passages. The voids are not necessarily free of all matter and/or particulates. For example, in some embodiments, a void may include one or more small fiber- or string-like objects that include, for example, a binder and/or nanoparticles. Some disclosed nano-porous adhesive tie layers include multiple pluralities of interconnected voids or multiple networks of voids where the voids in each plurality or network are interconnected. In some cases, in addition to multiple pluralities of interconnected voids, the disclosed nano-porous adhesive tie layers include a plurality of closed or unconnected voids meaning that the voids are not connected to other voids via tunnels.

In some embodiments, the disclosed nano-porous adhesive tie layers are sufficiently thick so that the nano-porous adhesive tie layers can reasonably have an effective index that can be expressed in terms of the indices of refraction of the voids and the binder, and the void or pore volume fraction or porosity. In such cases, the thickness of the nano-porous adhesive tie layer is not less than about 500 nm, or not less than about 1,000 nm, or in a range from 1 to 10 micrometers.

When the voids in a disclosed nano-porous adhesive tie layer are sufficiently small and the nano-porous adhesive tie layer is sufficiently thick, the nano-porous adhesive tie layer has an effective permittivity $\epsilon_{\it{eff}}$ that can be expressed as:

$$\epsilon_{\it{eff}} = f\epsilon_v + (1-f)\epsilon_b \quad (1)$$

In such cases, the effective index $n_{\it{eff}}$ of the nano-porous adhesive tie layer can be expressed as:

$$n_{\it{eff}}^2 = f n_v^2 + (1-f) n_b^2 \quad (2)$$

In some cases, such as when the difference between the indices of refraction of the pores and the binder is sufficiently small, the effective index of the nano-porous adhesive tie layer can be approximated by the following expression:

$$n_{\it{eff}} = f n_v + (1-f) n_b \quad (3)$$

In such cases, the effective index of the nano-porous adhesive tie layer is the volume weighted average of the indices of refraction of the voids and the binder. For example, a nano-porous adhesive tie layer that has a void volume fraction of about 50% and a binder that has an index of refraction of about 1.5, has an effective index of about 1.25. In many embodiments the nano-porous adhesive tie layer has an effective index of refraction in a range from 1.2 to 1.45. In some embodiments the nano-porous adhesive tie layer has an effective index of refraction in a range from 1.24 to 1.4.

FIG. 1 is a schematic cross-sectional view of a nano-porous adhesive tie layer 300 that includes a network of voids or plurality of interconnected voids 320 and a plurality of nanoparticles 340 dispersed substantially uniformly within a binder 310. Nano-porous adhesive tie layer 300 has a porous surface and interior by virtue of the presence of network of voids within the adhesive tie layer. In general, the nano-porous adhesive tie layer can include one or more networks of interconnected pores or voids. For example, the network of voids 320 can be regarded to include interconnected voids or pores 320A-320C. In some cases, the nano-porous adhesive tie layer is a porous layer meaning that the network of voids 320 forms one or more passages between first and second major surfaces 330 and 332, respectively.

The nano-porous adhesive tie layer has any useful thickness $t_1$ (linear distance between a first major surface 330 and second major surface 332). In many embodiments the nano-porous adhesive tie layer has any useful thickness $t_1$ that is not less than about 100 nm, or not less than about 500 nm, or not less than about 1,000 nm, or in a range from 0.1 to 10 micrometers or in a range from 1 to 10 micrometers.

The network of voids can be regarded to include a plurality of interconnected voids. Some of the voids can be at a surface of the nano-porous adhesive tie layer and can be regarded to be surface voids. For example, in the exemplary nano-porous adhesive tie layer 300, voids 320D and 320E are at a second major surface 332 of the nano-porous adhesive tie layer and can be regarded as surface voids 320D and 320E, and voids 320F and 320G are at a first major surface 330 of the nano-porous adhesive tie layer and can be regarded as surface voids 320F and 320G. Some of the voids, such as for example voids 320B and 320C, are within the interior of the optical film and away from the exterior surfaces of the optical film and can be regarded as interior voids 320B and 320C, even though an interior void can be connected to a major surface via, for example, other voids.

Voids 320 have a size $d_1$ that can generally be controlled by choosing suitable composition and fabrication, such as coating, drying and curing conditions. In general, $d_1$ can be any desired value in any desired range of values. For example, in some cases, at least a majority of the voids, such as at least 60% or 70% or 80% or 90% or 95% of the voids, have a size that is in a desired range. For example, in some cases, at least a majority of the voids, such as at least 60% or 70% or 80% or 90% or 95% of the voids, have a size that is not greater than about 10 micrometers, or not greater than about 7 micrometers, or not greater than about 5 micrometers, or not greater than about 4 micrometers, or not greater than about 3 micrometers, or not greater than about 2 micrometers, or not greater than about 1 micrometer, or not greater than about 0.7 micrometers, or not greater than about 0.5 micrometers.

In some cases, a plurality of interconnected voids 320 has an average void or pore size that is not greater than about 5 micrometers, or not greater than about 4 micrometers, or not greater than about 3 micrometers, or not greater than about 2 micrometers, or not greater than about 1 micrometer, or not greater than about 0.7 micrometers, or not greater than about 0.5 micrometers.

In some cases, some of the voids can be sufficiently small so that their primary optical effect is to reduce the effective index, while some other voids can reduce the effective index and scatter light, while still some other voids can be sufficiently large so that their primary optical effect is to scatter light.

Nanoparticles 340 have a size $d_2$ that can be any desired value in any desired range of values. For example, in some cases at least a majority of the particles, such as at least 60% or 70% or 80% or 90% or 95% of the particles, have a size that is in a desired range. For example, in some cases, at least a majority of the particles, such as at least 60% or 70% or 80% or 90% or 95% of the particles, have a size that is not greater than about 1 micrometer, or not greater than about 700 nm, or not greater than about 500 nm, or not greater than about 200 nm, or not greater than about 100 nm, or not greater than about 50 nm.

In some embodiments, the plurality of nanoparticles 340 has an average particle size that is not greater than about 1 micrometers, or not greater than about 1 micrometer, or not greater than about 700 nm, or not greater than about 500 nm, or not greater than about 200 nm, or not greater than about 100 nm, or not greater than about 50 nm.

In some embodiments, some of the nanoparticles can be sufficiently small so that they primarily affect the effective index, while some other nanoparticles can affect the effective index and scatter light, while still some other particles can be sufficiently large so that their primary optical effect is to scatter light.

Nanoparticles 340 may or may not be functionalized. In some embodiments, nanoparticles 340B are not functionalized. In many embodiments, nanoparticles 340 are functionalized or surface treated so that they can be dispersed in a desired solvent or binder 310 with no, or very little, clumping. In some embodiments, nanoparticles 340 can be further functionalized to chemically bond to binder 310. For example, nanoparticles such as nanoparticle 340A, can be surface modified or surface treated to have reactive functionalities or groups 360 to chemically bond to binder 310. Nanoparticles can be functionalized with multiple chemistries, as desired. In such cases, at least a significant fraction of nanoparticles 340A are chemically bound to the binder. In some cases, nanoparticles 340 do not have reactive functionalities to chemically bond to binder 310. In such cases, nanoparticles 340 can be physically bound to binder 310.

In some cases, some of the nanoparticles have reactive groups and others do not have reactive groups. For example in some cases, about 10% of the nanoparticles have reactive groups and about 90% of the nanoparticles do not have reactive groups, or about 15% of the nanoparticles have reactive groups and about 85% of the nanoparticles do not have reactive groups, or about 20% of the nanoparticles have reactive groups and about 80% of the nanoparticles do not have reactive groups, or about 25% of the nanoparticles have reactive groups and about 75% of the nanoparticles do not have reactive groups, or about 30% of the nanoparticles have reactive groups and about 70% of the nanoparticles do not have reactive groups, or about 35% of the nanoparticles have reactive groups and about 65% of the nanoparticles do not have reactive groups, or about 40% of the nanoparticles have reactive groups and about 60% of the nanoparticles do not have reactive groups, or about 45% of the nanoparticles have reactive groups and about 55% of the nanoparticles do not have reactive groups, or about 50% of the nanoparticles have reactive groups and about 50% of the nanoparticles do not have reactive groups.

The ensemble of nanoparticles may include a mixture of sizes, reactive and non-reactive particles and different types of particles (e.g., silica and zirconium oxide). In some embodiments, the nanoparticles include surface treated silica nanoparticles.

In some embodiments, nano-porous adhesive tie layer 300 has a low optical haze value. In such cases, the optical haze of the nano-porous adhesive tie layer is not greater than about 5%, or not greater than about 4%, or not greater than about 3.5%, or not greater than about 3%, or not greater than about 2.5%, or not greater than about 2%, or not greater than about 1.5%, or not greater than about 1%. For light normally incident on nano-porous adhesive tie layer 300, optical haze, as used herein, is defined as the ratio of the transmitted light that deviates from the normal direction by more than 4 degrees to the total transmitted light. Index of refraction values were measured using a Metricon Model 2010 Prism Coupler (available from Metricon Corp., Pennington, N.J.). Optical transmittance, clarity and haze were measured using a Haze-Gard Plus haze meter (available from BYK-Gardiner, Silver Springs, Md.).

In some embodiments, nano-porous adhesive tie layer 300 has a high optical haze. In such cases, the haze of the nano-porous adhesive tie layer 300 is not less than about 40%, or not less than about 50%, or not less than about 60%, or not less than about 70%, or not less than about 80%, or not less than about 90%, or not less than about 95%.

In general, the nano-porous adhesive tie layer can have any porosity or void volume fraction that may be desirable in an application. In some cases, the volume fraction of plurality of voids 320 in nano-porous adhesive tie layer 300 is not less than about 10%, or not less than about 20%, or not less than about 30%, or not less than about 40%, or not less than about 50%, or not less than about 60%, or not less than about 70%, or not less than about 80%, or not less than about 90%.

Binder 310 can be or include any material that may be desirable in an application. For example, binder 310 can be a UV curable material that forms a polymer, such as a cross-linked polymer. In general, binder 310 can be any polymerizable material, such as a polymerizable material that is radiation-curable.

In many embodiments, binder 310 includes a multifunctional acrylate and polyurethane. This binder 310 can be a polymerization product of a photoiniator, a multifunctional acrylate and a polyurethane oligomer. The combination of a multifunctional acrylate and a polyurethane oligomer can produce durable nano-porous adhesive tie layer 300. The polyurethane or polyurethane oligomer is capable of reacting with acrylates or "capped" with an acrylate to be capable of reacting with other acrylates in the polymerization reaction described herein.

Nano-porous adhesive tie layer 300 can be produced using any method that may be desirable in an application. In some cases, nano-porous adhesive tie layer 300 can be produced by the processes described in pending U.S. provisional application 61/169,429 titled "PROCESS AND APPARATUS FOR A NANOVOIDED ARTICLE", filed on Apr. 15, 2009, the disclosures of which are incorporated in their entirety herein by reference.

In one illustrative process, first a solution is prepared that includes a plurality of nanoparticles, and a polymerizable material dissolved in a solvent, where the polymerizable material can include, for example, one or more types of monomers. The polymerizable material can be coated onto a substrate or the like. Next, the polymerizable material is polymerized, for example by applying heat or light, to form an insoluble polymer matrix in the solvent. In some cases, after the polymerization step, the solvent may still include some of the polymerizable material, although at a lower concentration. Next, the solvent is removed by drying or evaporating the solution resulting in Nano-porous adhesive tie layer 300 that includes a network, or a plurality of voids 320 dispersed in polymer binder 310. The nano-porous adhesive tie layer 300 includes a plurality of nanoparticles 340 dispersed in the polymer binder. The nanoparticles are bound to the binder, where the bonding can be physical or chemical.

In general, nano-porous adhesive tie layer 300 can have a desirable porosity for any weight ratio of binder 310 to plurality of nanoparticles 340. Accordingly, in general, the weight ratio can be any value that may be desirable in an application. In some cases, the weight ratio of binder 310 to a plurality of nanoparticles 340 is not less than about 1:2.5, or not less than about 1:2.3, or not less than about 1:2, or not less than about 1:1, or not less than about 1.5:1, or not less than about 2:1, or not less than about 2.5:1, or not less than about 3:1, or not less than about 3.5:1, or not less than about 4:1, or not less than about 5:1. In some cases, the weight ratio is in a range from about 1:2.3 to about 4:1.

Figure 2:
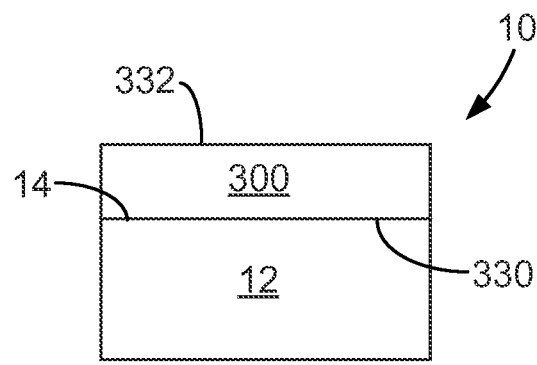
FIG. 2 is a schematic side elevation view of an adhesive article including a nano-porous adhesive tie layer.
Figure 3:
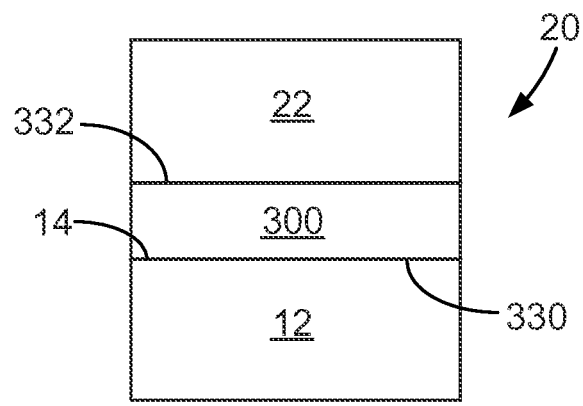
FIG. 3 is a schematic side elevation view of another adhesive article including a nano-porous adhesive tie layer.
Figure 4:
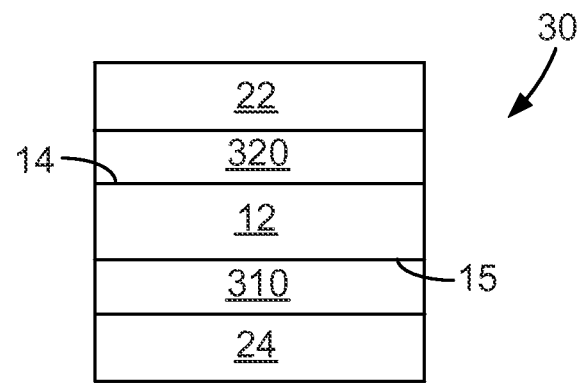
FIG. 4 is a schematic side elevation view of a further adhesive article including nano-porous adhesive tie layers.

FIG. 2 is a schematic side elevation view of an adhesive article 10 including a nano-porous adhesive tie layer 300. FIG. 3 is a schematic side elevation view of another adhesive article 20 including a nano-porous adhesive tie layer 300. FIG. 4 is a schematic side elevation view of a further adhesive article 30 including nano-porous adhesive tie layers 310, 320.

FIG. 2 illustrates an adhesive article 10 including a nano-porous adhesive tie layer 300 disposed on a substrate 12. The nano-porous adhesive tie layer 300 has a first major surface 330 and an opposing second major surface 332. The first major surface 330 of the nano-porous adhesive tie layer 300 physically contacts and bonds to the substrate 12.

The nano-porous adhesive tie layer 300 disposed on a substrate 12 via any useful method. In many embodiments a nano-porous adhesive tie layer precursor material is wet coated onto the substrate 12 and then cured or polymerized and dried to form the nano-porous adhesive tie layer 300.

The substrate 12 can be a polymeric film having any useful thickness. In many embodiments the polymeric film has a thickness in a range from 10 to 1000 micrometers. In many embodiments the substrate 12 is polyester such as polyethylene terephthalate, for example. In some embodiments the substrate 12 is polyolefin. The substrate 12 can be a multilayer film or a film having functional properties (e.g., optical, color, light reflection).

In many embodiments a primer layer 14 is disposed on the substrate 12. The primer layer 14 can assist in bonding the nano-porous adhesive tie layer 300 to the substrate 12. The primer layer 14 is between or separates the nano-porous adhesive tie layer 300 and the substrate 12. The primer layer 14 can be formed of any useful primer and are often already provided on many commercially available substrates 12, as described in the example section.

FIG. 3 illustrates an adhesive article 20 including a nano-porous adhesive tie layer 300 between and securing the substrate 12 to an adhesive layer 22. The adhesive layer 22 can be disposed on the nano-porous adhesive tie layer 300 via any useful method. In many embodiments the adhesive 22 is wet (solvent or water based) coated onto the nano-porous adhesive tie layer 300 and then dried. In other embodiments the adhesive 22 is hot melt coated or dry laminated onto the nano-porous adhesive tie layer 300.

The adhesive layer 22 is formed of any useful adhesive material. In many embodiments the adhesive material does not readily bond to the substrate 12 material without the addition of the nano-porous adhesive tie layer 300. In many embodiments the adhesive material is an acrylic material, or a rubber/resin or a silicone material. The adhesive layer 22 can have any useful thickness. In many embodiments the adhesive layer 22 has a thickness in a range from 10 to 2000 micrometers or from 10 to 1200 micrometers.

Exemplary adhesives include pressure sensitive adhesives (PSAs), heat-activated adhesives, solvent-volatile adhesives, repositionable adhesives or reworkable adhesives, and UV-curable adhesives such as UV-curable optical adhesives available from Norland Products, Inc.

Exemplary PSAs include those based on natural rubbers, synthetic rubbers, styrene block copolymers, (meth)acrylic block copolymers, polyvinyl ethers, polyolefins, and poly(meth)acrylates. As used herein, (meth)acrylic (or acrylate) refers to both acrylic and methacrylic species. Other exemplary PSAs include rubbers, thermoplastic elastomers, silicones, urethanes, and combinations thereof. In some cases, the PSA is based on a (meth)acrylic PSA or at least one poly(meth)acrylate. Exemplary silicone PSAs include a polymer or gum and an optional tackifying resin. Other exemplary silicone PSAs include a polydiorganosiloxane polyoxamide and/or polydiorganosiloxane polyurea and an optional tackifier.

In many embodiments, disposing the adhesive layer 22 on the nano-porous adhesive tie layer 300 reduces the optical haze of adhesive article 20 and 30. For example, if the adhesive tie layer 10 has a measured haze value of X, placing the adhesive layer 22 on the nano-porous adhesive tie layer to form the adhesive article 20 reduces the value X to a lower value. In other words, the addition of the adhesive layer 22 can improve the optical appearance of the article 10. While not wishing to be bound by any particular theory, it is believed that the adhesive material in the adhesive layer 22 can migrate into at least a portion of the voids 320 of nano-porous adhesive tie layer 300 and thus reduce a haze value of the adhesive article 20, 30 as compared to the adhesive tie layer article 10.

FIG. 4 is a schematic side elevation view of a further adhesive article 30 including nano-porous adhesive tie layers 310, 320 adhering dual adhesive layers 22, 24 onto a central substrate 12. In some embodiments the adhesive articles 20 and 30 include a release liner or liners (not shown). The release force for releasing the adhesive layer 22 and/or 24 from a release liner is generally less than about 200 g-force/inch, or less than about 150 g-force/inch, or less than about 100 g-force/inch, or less than about 75 g-force/inch, or less than about 50 g-force/inch.

EXAMPLES

Refractive Index Measurements

The refractive indices of the optical coatings were measured at 632.8 nm using a Metricon MODEL 2010 prism coupler (Metricon Corporation Inc. Pennington, N.J.). The optical coating to be measured is brought into contact with the base of a Rutile prism, leaving an air gap of the order of 0.1 µm. A light beam from a laser enters the prism and strikes the base of the prism. The light is thus totally reflected at the prism base onto the photodetector. The total reflection leaves only evanescent fields in the air gap. Through these evanescent fields, the light wave from the prism is coupled into the waveguide. The prism, the sample, and the photodetector are mounted on a rotating table so that the incident angle of the laser beam can be changed correspondingly. Coupling is strongest when the following phase matching condition is satisfied: $\beta_m = \kappa_o n_p \sin(\theta_m)$—where $\beta_m$ is the propagation constant, $\kappa_o = \omega/c$, $n_p$ is the prism refractive index and m is the coupling angle.

At certain angles of incidence, sharp reflectivity dips occur in the spectrum corresponding to the excitation of guided modes. This is known as the dark mode line spectrum and the dips are known as the 'dark' m-lines. At $\beta_m$, the light is coupled into the waveguide, thus resulting in a lack of reflected light at the base of the prism, consequently forming the dark mode line spectrum. From the positions of $\beta_m$, it is possible to determine the mode effective indices, the waveguide thickness, and the refractive index, n, of the waveguide.

Primer Adhesion Test Method:

Priming quality was assessed by affixing a 0.5"×6" strip of adhesive coated film to a bench top by securing both ends of the strip with PSA tape, such that the adhesive surface of the test strip is oriented upward. Next, equidistant from the ends of the test strip, a 0.5" diameter mandrel with a radiused end was employed to scrape/abrade the adhesive away from the central section of the strip in order to expose the primed film below the adhesive layer, and leaving each respective end of the strip covered with adhesive. The exposed adhesive edges were then probed by hand to determine if the adhesive could be removed from the backing by rolling it with thumb and/or fingers, picking at it similarly, or stretching the PSA. The following rating system was employed.

| Primer Rating | Observation |
|---|---|
| 1 | Adhesive can be easily rolled, picked and stretched off the film |
| 3 | Adhesive can be rolled, picked and stretched off the film, but requires significant effort to remove adhesive |
| 5 | Adhesive can be rolled off the film with great difficulty, picking results in only small amounts of adhesive removed, and stretch-release occurs with significant force and frequent adhesive breaks occur during stretching |
| 6 | Adhesive can not be removed - very difficult/impossible to abrade adhesive down to primed surface with mandrel, impossible to continuously roll, pick or stretch-release adhesive from film |

Preparation of Nanoporous Adhesive Tie Layer (NTL) Coating using 20 nm Silica

First, 360 g of Nalco 2327 colloidal silica particles (40% wt solid and an average particle diameter of about 20 nanometers) (available from Nalco Chemical Company, Naperville Ill.) and 300 g of solvent 1-methoxy-2-propanol were mixed together under rapid stirring in a 2-liter three-neck flask that was equipped with a condenser and a thermometer. Next, 22.15 g of Silquest A-174 silane (available from GE Advanced Materials, Wilton Conn.) was added. The mixture was stirred for 10 min. Next, an additional 400 g of 1-methoxy-2-propanol was added. The mixture was heated at 85 degrees centigrade for 6 hours using a heating mantle. The resulting solution was allowed to cool down to room temperature. Next, most of the water and 1-methoxy-2-propanol solvents (about 700 g) were removed using a rotary evaporator under a 60 degrees centigrade water-bath. The resulting clear solution was 43.4% wt % A-174 modified 20 nm colloidal silica particles dispersed in 1-methoxy-2-propanol.

A coating solution A was made by mixing/dissolving CN9893, an aliphatic urethane acrylic oligomer (Sartomer, Exton, Pa.), in a mixture of isopropyl alcohol (IPA) and ethyl acetate (EA) under ultrasonic treatment first, then mixing A-174 modified 20 nm silica (formed above), pentaerythritol triacrylate SR444, and photoiniators (Irg 184 and Irg 819) together in the proportions shown in Table 1 below, under stirring to form a homogenous coating solution.

TABLE 1

| | Supplier | % Solid | Amount (g) |
|---|---|---|---|
| A-174 Silica Nalco 2327 | | 43.40% | 64.50 |
| CN9893 | Sartomer, Exton, PA | 100.00% | 5.70 |
| SR444 | Sartomer, Exton, PA | 100.00% | 22.40 |
| IPA | | 0.00% | 33.40 |
| EA | | 0.00% | 33.40 |
| Irg 184 | Ciba Specialty Chemicals Company, High Point NC | 100.00% | 0.78 |
| IRG 819 | Ciba Specialty Chemicals Company, High Point NC | 100.00% | 0.15 |
| Total | | | 160.3 |

Next, the coating solution A was coated on 2 mil PET (commercially available under the tradename Tejin Film 617 from Dupont) using the coating method described below:

The coating solution was syringe-pumped at the specified rates into a 10.2 cm (4-inch) wide slot-type coating die. The slot coating die uniformly distributed a 10.2 cm wide coating onto a substrate moving at 5 ft/min.

Next, the coating was polymerized by passing the coated substrate through a UV-LED cure chamber that included a quartz window to allow passage of UV radiation. The UV-LED bank operated at a nominal wavelength of 395 nm, and resulted in a UV-A dose of 0.1352 joules/cm$^2$. The UV-LEDs were positioned above the cure chamber quartz window at a distance of approximately 2.54 cm from the substrate. The UV-LED cure chamber was supplied with an oxygen concentration of approximately 150 ppm.

After being polymerized by the UV-LEDs, the solvent in the cured coating was removed by transporting the coating to a drying oven operating at 65 degrees centigrade for 2 minutes at a web speed of 5 ft/min. Next, the dried coating was post-cured using a Fusion System Model I300P configured with an H-bulb (available from Fusion UV Systems, Gaithersburg Md.). The UV Fusion chamber was supplied with a flow of nitrogen that resulted in an oxygen concentration of approximately 50 ppm in the chamber.

The resulting nano-porous adhesive tie layer had a refractive index (RI) of 1.16, and a thickness of about 5 micrometers. The coating conditions and resulting optical properties of various other nano-porous adhesive tie layer preparations are listed in Table 2.

TABLE 2

| ID | Pump Speed (cc/min) | UV-LED (amps) | Optics T % | H % | RI |
|---|---|---|---|---|---|
| 6252009-57 | 2.5 | 0 | 92.5 | 0.39 | 1.493 |
| 6252009-61 | 2.5 | 7 | 94.2 | 1.37 | 1.24 |
| 6252009-65 | 2.0 | 5 | 94.4 | 0.91 | 1.255 |
| 6252009-70 | 1.0 | 13 | 94.1 | 0.44 | 1.377 |

Preparation of A-174 Modified Elongated Nanoparticles

In a 2 liter three-neck flask, equipped with a condenser and a thermometer, 960 grams of IPA-ST-UP organosilica elongated particles (available from Nissan Chemical Inc., Houston, Tex.), 19.2 grams of deionized water, and 350 grams of 1-methoxy-2-propanol were mixed under rapid stirring. The elongated particles had a diameter in a range from about 9 nm to about 15 nm and a length in a range of about 40 nm to about 100 nm. The particles were dispersed in a 15.2% wt IPA. Next, 22.8 grams of Silquest A-174 silane (available from GE Advanced Materials, Wilton, Conn.) was added to the flask. The resulting mixture was stirred for 30 minutes.

The mixture was kept at 81 degrees centigrade for 16 hours. Next, the solution was allowed to cool to room temperature. Next, about 950 grams of solvent were removed from the solution using a rotary evaporator under a 40 degrees centigrade water-bath, resulting in a 41.7% wt A-174-modified elongated silica clear dispersion in 1-methoxy-2-propanol.

A coating solution B was made by first dissolving 3.6 g of CN 9893 and 2.4 g of CN 9013 in 35 g of ethyl acetate under ultrasonic agitation, then 72 g of A-174 modified elongated silica prepared as above, 35 g of IPA, and 24 g of SR444 were added to form a homogenous solution, finally, 0.7 g of Irgacure 184 and 0.09 g of Irgacure 819 were added.

A coating solution C was made by first dissolving 3.2 g of Ebecryl 8411 and 3.3 g of CN 9013 in 35 g of ethyl acetate under ultrasonic, then 77.8 g of A-174 modified elongated silica prepared as above, 35 g of IPA, and 24 g of SR44 were added to form a homogenous solution, finally, 0.7 g of Irgacure 184 and 0.09 g of Irgacure 819 were added.

Both solution B and C were coated on the Dupont Teijin 2-mil PET film as described above. The coating conditions employed and resulting optical properties are summarized in Table 3.

TABLE 3

| Solution | ID | Pump Speed (cc/min) | UV-LED (amps) | Optics T % | H % | RI |
|---|---|---|---|---|---|---|
| B | 07022009-23 | 2.0 | 5 | 94.2 | 1.37 | 1.2514 |
| B | 07022009-24 | 2.0 | 9 | 94.4 | 0.91 | 1.2535 |
| C | 07022009-31 | 3 | 3 | 93.7 | 0.75 | 1.2166 |
| C | 07022009-37 | 2 | 5 | 93.9 | 0.53 | 1.2390 |
| C | 07022009-38 | 2 | 9 | 93.9 | 0.55 | 1.2436 |

Preparation of Chlorinated Polyolefin Primed Films

Solutions of Eastman Chemical chlorinated polyolefins, 343-3 and 730-1, were prepared at 1% solids in toluene and applied, using a #10 wire round rod to freshly corona treated 2 mil PET and dried for 5 minutes at 70 degrees centigrade in a forced air oven, to provide samples CP343-3 and CP730-1.

Factory Primed PET Films

The following factory made PET films were procured for testing.

Factory Primed PET Films

| Primed Sample ID | Source | Product/Primer |
|---|---|---|
| 1 | Dupont Teijin Films | Melinex 453 |
| 2 | Dupont Teijin Films | Melinex 617 |
| 3 | Dupont Teijin Films | Melinex 618 |
| 4 | Dupont Teijin Films | Mylar A (unprimed) |
| 5 | Mitsubishi Films | 3 SAB |
| 6 | Mitsubishi Films | 3 SAC |
| 7 | Mitsubishi Films | 4507-33 |

A UV curable acrylic PSA was prepared according to the following method (as described in EP 0 372 756 B1) where "parts" refer to parts per hundred parts of acrylic monomer. A solution of 2-ethylhexyl acrylate (2-EHA) containing 0.04 pt photoinitiator was irradiated under low intensity UV lights (0.15 mJ/cm2 total dose) to provide a syrup having a viscosity of ~500 cP. To this syrup was charged and mixed well, 0.2 pt additional photoinitiator, 0.5 pt diacrylate, and 15 pt fumed silica. The resulting adhesive solution was knife coated onto hand sheets of the primed films described above, using a dual-liner process, at an adhesive coat thickness of ~15 mils and cured under low intensity UV via exposure to 1100 mJ/cm$^2$ total energy.

The resulting adhesive coated films were tested for primer adhesion as described above and the results reported in Table A.

TABLE A

Primer Rating of Various Primed PET Films

| Primed Sample ID | Primed Sample Source | Primer | Obs 1 | Obs 2 | Obs 3 | Average |
|---|---|---|---|---|---|---|
| 6252009-57 | Lab made | hardcoat | 1 | 1 | 1 | 1 |
| 6252009-61 | Lab made | NTL | 6 | 6 | 6 | 6 |
| 6252009-65 | Lab made | NTL | 6 | 6 | 6 | 6 |
| 6252009-70 | Lab made | NTL | 6 | 6 | 6 | 6 |
| 07022009-23 | Lab made | NTL | 1 | 1 | 1 | 1 |
| 07022009-24 | Lab made | NTL | 1 | 1 | 1 | 1 |
| 07022009-31 | Lab made | NTL | 1 | 1 | 1 | 1 |
| 07022009-37 | Lab made | NTL | 1 | 1 | 1 | 1 |
| 07022009-38 | Lab made | NTL | 1 | 1 | 1 | 1 |
| CP343-3 | Lab made | CP 343-3 | 3 | 3 | 3 | 3 |
| CP730-1 | Lab made | CP 730-1 | 5 | 5 | 5 | 5 |
| 1 | Dupont Teijin Films | Melinex 453 | 1 | 1 | 1 | 1 |
| 2 | Dupont Teijin Films | Melinex 617 | 1 | 1 | 1 | 1 |
| 3 | Dupont Teijin Films | Melinex 618 | 1 | 1 | 1 | 1 |
| 4 | Dupont Teijin Films | Mylar A (unprimed) | 1 | 1 | 1 | 1 |
| 5 | Mitsubishi Films | 3SAB | 1 | 1 | 1 | 1 |
| 6 | Mitsubishi Films | 3SAC | 1 | 1 | 1 | 1 |
| 7 | Mitsubishi Films | 4507-37 | 1 | 1 | 1 | 1 |

The results in Table A show that only those films that included the nano-porous adhesive tie layer provided a primer rating of 6.

Formulation A was scaled-up as shown below and coated 8 inches wide on PET films using the parameters shown in Table B. For conditions 11 to 26 of Table B, additional Irgacure 819 was added to provide 0.6% photoinitiator based on total solid content of the coating solutions.

| | Supplier | % Solid | Amount (Kg) |
|---|---|---|---|
| A-174 Silica Nalco 2327 | | 43.40% | 3.225 |
| CN9893 | Sartomer, Exton, PA | 100.00% | 0.285 |
| SR444 | Sartomer, Exton, PA | 100.00% | 1.120 |
| IPA | | 0.00% | 1.670 |
| EA | | 0.00% | 1.670 |
| Irg 184 | Ciba Specialty Chemicals Company, High Point NC | 100.00% | 39 (g) |
| IRG 819 | Ciba Specialty Chemicals Company, High Point NC | 100.00% | 7.5 (g) |
| Total | | | 8.015 |

TABLE B

Primer Rating of Various Nano-porous Adhesive Tie layer coated PET Films

| Sample# | Web Speed (fpm) | Flow Rate (rpm) | Vacuum (in H2O) | UV-LED Power (amps) | Photo-initiator 819 content | 2 mil PET | Optical Properties RI | Trans | Haze | Primer Rating Obs 1 | Obs 2 | Obs 3 | Avg |
|---|---|---|---|---|---|---|---|---|---|---|---|---|---|
| 1 | 25 | 10 | 1.2 | 0 | 0.3% | P56 | 1.4856 | — | — | 1 | 1 | 3 | 1.7 |
| 2 | 25 | 10 | 1.2 | 12 | 0.3% | P56 | 1.3780 | — | — | 3 | 1 | 1 | 1.7 |
| 3 | 50 | 27 | 1.5 | 0 | 0.3% | P56 | — | — | — | 1 | 3 | 5 | 3.0 |
| 4 | 50 | 27 | 1.5 | 12 | 0.3% | P56 | 1.2690 | 92.9 | 1.83 | 1 | 1 | 1 | 1.0 |
| 5 | 75 | 52 | 1.6 | 0 | 0.3% | P56 | — | — | — | 5 | 5 | 5 | 5.0 |
| 6 | 75 | 52 | 1.6 | 12 | 0.3% | P56 | 1.2900 | 91.8 | 6.19 | 3 | 1 | 1 | 1.7 |
| 7 | 100 | 78 | 2 | 0 | 0.3% | P56 | 1.4950 | — | — | 6 | 6 | 6 | 6.0 |
| 8 | 100 | 78 | 2 | 12 | 0.3% | P56 | 1.3813 | 90 | 44.70 | 1 | 1 | 6 | 2.7 |
| 9 | 125 | 102 | 2.4 | 0 | 0.3% | P56 | — | — | — | 6 | 6 | 6 | 6.0 |
| 10 | 125 | 102 | 2.4 | 12 | 0.3% | P56 | — | — | — | 6 | 6 | 6 | 6.0 |
| 11 | 100 | 80 | 1.6 | 12 | 0.6% | P56 | 1.2989 | 91.6 | 8.22 | 1 | 1 | 1 | 1.0 |
| 12 | 100 | 80 | 1.6 | 10 | 0.6% | P56 | 1.3159 | 91.3 | 12.90 | 1 | 1 | 1 | 1.0 |
| 13 | 100 | 80 | 1.6 | 8 | 0.6% | P56 | 1.3451 | 90.9 | 20.85 | 1 | 1 | 1 | 1.0 |
| 14 | 100 | 80 | 1.6 | 6 | 0.6% | P56 | 1.3700 | 90.1 | 38.25 | 1 | 1 | 1 | 1.0 |
| 15 | 100 | 80 | 1.6 | 4 | 0.6% | P56 | 1.4472 | 92.7 | 38.35 | 5 | 3 | 6 | 4.7 |
| 16 | 100 | 80 | 1.6 | 2 | 0.6% | P56 | — | — | — | 5 | 5 | 6 | 5.3 |
| 17 | 100 | 80 | 1.6 | 12 | 0.6% | Rhoplex primed | 1.3254 | 91.9 | 19.40 | 6 | 6 | 6 | 6.0 |
| 18 | 100 | 80 | 1.6 | 10 | 0.6% | Rhoplex primed | 1.3477 | 91.2 | 25.50 | 6 | 6 | 6 | 6.0 |
| 19 | 100 | 80 | 1.6 | 8 | 0.6% | Rhoplex primed | 1.3795 | 90.7 | 41.30 | 6 | 6 | 6 | 6.0 |
| 20 | 100 | 80 | 1.6 | 6 | 0.6% | Rhoplex primed | 1.4400 | 91.8 | 68.50 | 6 | 6 | 6 | 6.0 |
| 21 | 75 | 52 | 1.3 | 12 | 0.6% | Rhoplex primed | 1.2557 | 93.7 | 3.14 | 6 | 6 | 6 | 6.0 |
| 22 | 75 | 52 | 1.3 | 10 | 0.6% | Rhoplex primed | 1.2659 | 93.5 | 4.29 | 6 | 6 | 6 | 6.0 |
| 23 | 75 | 52 | 1.3 | 8 | 0.6% | Rhoplex primed | 1.2836 | 93.2 | 5.63 | 6 | 6 | 6 | 6.0 |
| 24 | 75 | 52 | 1.3 | 6 | 0.6% | Rhoplex primed | 1.3297 | 92.8 | 10.20 | 6 | 6 | 6 | 6.0 |
| 25 | 75 | 52 | 1.3 | 4 | 0.6% | Rhoplex primed | 1.3700 | — | — | 6 | 6 | 6 | 6.0 |
| 26 | 75 | 52 | 1.3 | 2 | 0.6% | Rhoplex primed | — | — | — | 6 | 6 | 6 | 6.0 |
| 27 | 906 hardcoat | — | — | — | — | — | — | — | — | 1 | 1 | 1 | 1.0 |

The results in Table B show that excellent adhesion is consistently achieved when the nano-porous adhesive tie layer coatings are applied to Rhoplex primed PET film (Rhoplex is commercially available from Rhom and Haas, Philadelphia, Pa.), whereas priming performance is less consistent when the nano-porous adhesive tie layer coatings are applied to plain PET film (P56). The data also show that excellent adhesion was achieved from the nano-porous adhesive tie layers having RI ranging from 1.256 to 1.495. The level of haze occurring in the nano-porous adhesive tie layer films does not impact adhesion, and furthermore, once wetted with adhesive, the haze disappears and the final constructions appear optically clear to the naked eye.

The optical properties of the nano-porous adhesive tie layer coatings with adhesive overcoat prepared in Table B were measured and the results are found in Table C. The refractive indices of these samples were measured from the backside of the PET where the PET is contacted with the prism of the Metricon prism coupler. The film stack between the prism and sample holder is PET/NTL/Adhesive/Liner.

TABLE C

| Sample Number | Optical Properties without Adhesive | | | Optical Properties With Adhesive Overcoat | | |
|---|---|---|---|---|---|---|
| | RI | T % | H % | RI | T % | H % |
| 2 | 1.3780 | | | 1.4630 | 88.6 | 3.83 |
| 3 | 1.4936 | | | 1.4638 | 87.9 | 3.39 |
| 4 | 1.853 | 92.9 | 1.83 | 1.4640 | 87.5 | 3.17 |
| 5 | 1.4947 | | | 1.4652 | 88.5 | 3.19 |
| 6 | 1.2938 | 91.8 | 6.19 | 1.4645 | 88 | 2.94 |
| 7 | 1.495 | | | 1.4635 | 88.2 | 4.6 |

TABLE C-continued

| Sample Number | Optical Properties without Adhesive | | | Optical Properties With Adhesive Overcoat | | |
|---|---|---|---|---|---|---|
| | RI | T % | H % | RI | T % | H % |
| 8 | 1.3813 | 90 | 44.7 | 1.4642 | 87.7 | 3.5 |
| 11 | 1.2989 | 91.6 | 8.22 | 1.4637 | 88.3 | 4.39 |
| 12 | 1.3159 | 91.3 | 12.9 | 1.4637 | 87.9 | 3.38 |
| 13 | 1/3451 | 90.9 | 20.85 | 1.4633 | 88.1 | 4 |
| 14 | 1.37 | 90.1 | 38.25 | 1.4654 | 88.4 | 3.62 |
| 15 | 1.4472 | 92.7 | 38.4 | 1.4628 | 88.1 | 3.81 |
| 17 | 1.3254 | 91.9 | 19.4 | 1.4633 | | |
| 18 | 1.3477 | 91.2 | 25.5 | 1.4645 | 88.9 | 2.85 |
| 19 | 1.3795 | 90.7 | 41.3 | 1.4651 | 88.8 | 3.78 |
| 20 | 1.44 | 91.8 | 68.5 | 1.4656 | 88.4 | 3.54 |
| 21 | 1.2557 | 93.7 | 3.14 | 1.4640 | 88.3 | 3 |
| 22 | 1.2659 | 93.5 | 4.29 | 1.4635 | 88.8 | 3.1 |
| 23 | 1.2836 | 93.2 | 5.63 | 1.4658 | 88.5 | 8.78 |
| 24 | 1.3297 | 92.8 | 10.2 | 1.4668 | 88.8 | 4.93 |
| 25 | 1.37 | — | — | 1.4642 | 88.9 | 5.04 |
| 24 | 1.3297 | 92.8 | 10.2 | 1.4668 | | |

As shown in Table C, the value of RI with adhesive overcoats strongly indicates that the adhesives has penetrated into the nano-pores, thus forming an interpenetrating network, which increases contact area between adhesives and sub-layer, thus greatly improving the adhesion. Another indication that adhesive filling of the nano-pore occurs is that the hazy nano-porous adhesive tie layer becomes clear with application of the adhesive overcoat.

Table D provides a comparison of primer effectiveness and optical properties, pre- and post-adhesive coated, of nano-porous adhesive tie layers based on spherical and elongated nano-particles.

TABLE D

The comparison of nano-porous adhesive tie layer prepared using
20 nm silica (Nalco 2327) and elongated silica (IPA-ST-UP)

| Primed Sample ID | Nano-particle Shape | RI without Adhesives | RI with Adhesives | Primer Rating |
|---|---|---|---|---|
| 6252009-57 | Elongated | 1.493 | 1.4659 | 1 |
| 6252009-61 | Spherical | 1.24 | 1.4645 | 6 |
| 6252009-65 | Spherical | 1.255 | 1.4658 | 6 |
| 6252009-70 | Spherical | 1.377 | 1.4667 | 6 |
| 07022009-23 | Elongated | 1.2521 | 1.2706 | 1 |
| 07022009-24 | Elongated | 1.2621 | 1.2686 | 1 |
| 07022009-31 | Elongated | 1.2166 | 1.2309 | 1 |
| 07022009-37 | Elongated | 1.2390 | 1.2405 | 1 |

As shown in Table D, the RI of nano-porous adhesive tie layers prepared using elongated silica nanoparticles remains very small or unchanged with adhesive overcoats, indicating less adhesive penetration, thus no adhesion promotion. On the other hand, the nano-porous adhesive tie layers prepared using 20 nm spherical silica shows significant changes in RI with adhesive overcoats, indicating more complete pore filling occurring in such systems.

Those having skill in the art will appreciate that many changes may be made to the details of the above-described embodiments and implementations without departing from the underlying principles thereof. Further, various modifications and alterations of the present application will become apparent to those skilled in the art without departing from the spirit and scope of the invention. The scope of the present application should, therefore, be determined only by the following claims.

What is claimed is:

1. An adhesive article, comprising:
an adhesive forming an adhesive layer;
a polymeric substrate; and
an adhesive tie layer between the adhesive layer and the polymeric substrate, the adhesive tie layer securing the adhesive layer to the polymeric substrate, the adhesive tie layer comprising:
a binder comprising a multifunctional acrylate and a polyurethane;
surface treated nanoparticles dispersed in the binder; and
a plurality of interconnected voids, a volume fraction of interconnected voids in the adhesive tie layer is not less than about 10%, wherein the adhesive fills at least a portion of the plurality of interconnected voids.

2. An adhesive article according to claim 1, wherein the adhesive comprises an acrylic adhesive.

3. An adhesive article according to claim 1, wherein the adhesive tie layer has a thickness in a range from 0.1 to 10 micrometers.

4. An adhesive article according to claim 1, wherein the adhesive article has a refractive index of 1.4 or greater.

5. An adhesive article according to claim 1, wherein the adhesive article has an optical haze value that is less than an optical haze value of the adhesive tie layer.

6. An adhesive article according to claim 1, further comprising a primer layer separating the adhesive tie layer and the polymeric substrate.

* * * * *